US009176761B2

(12) United States Patent
DeHaan et al.

(10) Patent No.: US 9,176,761 B2
(45) Date of Patent: Nov. 3, 2015

(54) MANAGEMENT OF MAINFRAME RESOURCES IN PRE-BOOT ENVIRONMENT

(75) Inventors: Michael Paul DeHaan, Morrisville, NC (US); Bradford E. Hinson, Raleigh, NC (US); James Laska, Cary, NC (US); Robert Justin Payne, Cedar Grove, NC (US); Brandon Perkins, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 343 days.

(21) Appl. No.: 12/475,436

(22) Filed: May 29, 2009

(65) Prior Publication Data
US 2010/0306359 A1 Dec. 2, 2010

(51) Int. Cl.
G06F 15/173 (2006.01)
G06F 9/455 (2006.01)
G06F 9/44 (2006.01)
G06F 15/16 (2006.01)

(52) U.S. Cl.
CPC .......... G06F 9/45533 (2013.01); G06F 9/4416 (2013.01)

(58) Field of Classification Search
CPC ..................... G06F 9/4416; G06F 9/45533
See application file for complete search history.

(56) References Cited

U.S. PATENT DOCUMENTS

| 5,396,630 | A  | * | 3/1995  | Banda et al. .................. 719/316 |
| 7,979,260 | B1 | * | 7/2011  | Sobel et al. ..................... 703/13 |
| 8,296,762 | B2 | * | 10/2012 | Knauerhase et al. ............ 718/1 |
| 2005/0091349 | A1 | * | 4/2005  | Scheibli ........................ 709/222 |
| 2008/0046708 | A1 | * | 2/2008  | Fitzgerald et al. ................ 713/2 |
| 2009/0193413 | A1 | * | 7/2009  | Lee .................................. 718/1 |
| 2009/0276620 | A1 | * | 11/2009 | McCarron et al. ............ 713/155 |
| 2009/0276772 | A1 | * | 11/2009 | Garrett et al. ..................... 718/1 |
| 2010/0185590 | A1 | * | 7/2010  | D'Angelo et al. ............ 707/674 |
| 2010/0218014 | A1 | * | 8/2010  | Bozek et al. .................. 713/320 |

* cited by examiner

Primary Examiner — Joseph Greene
(74) Attorney, Agent, or Firm — Lowenstein Sandler LLP

(57) ABSTRACT

Embodiments relate to systems and methods for the management of mainframe resources in a pre-boot environment. According to embodiments, a network management platform, for instance a platform equipped or compatible with pre-boot discovery and management tools such as the known pre-boot execution environment (PXE), can integrate a set of mainframe-based virtual machines using a pre-boot management engine. The pre-boot management engine can reside in or communicate with the mainframe operating system, and present a set of resources to the network management platform to allow the platform to include time-sliced or other virtual machines or resources, into the pre-boot protocol. According to embodiments, for instance, the set of virtual machines can be assigned temporary or pseudo media access control (MAC) or other hardware identifiers, so that the network management platform can view individual mainframe-based virtual machines as having a network connection and thereby receive similar boot commands to hardware-based client machines.

20 Claims, 4 Drawing Sheets

MANAGEMENT OF MAINFRAME RESOURCES IN PRE-BOOT ENVIRONMENT

FIELD

The present teachings relate to systems and methods for management of mainframe resources in a pre-boot environment, and more particularly to platforms and techniques for seamlessly integrating a set of mainframe-based virtual machines into a managed pre-boot environment.

BACKGROUND OF RELATED ART

In the network management field, a number of platforms and tools exist to allow a systems administrator to manage the attachment and integration of new or existing machines into a managed network. One class of available tools makes use of the preboot execution environment (PXE) standard, originally established by Intel Corp. and Systemsoft Corp., according to which network-connected machines can be booted via a network interface alone, regardless of attached storage or installed operating systems.

The use of PXE-based network management tools can be constrained, however, by the types of target machines attempting to boot into the network. The PXE-based network management tools are generally configured to communicate with and manage personal-computer class machines, such as machines running Intel Corp. processors, as well as distributions of the Linux™ operating system and/or Windows™ family of operating systems available form Microsoft Corp., in part because machines configured with that class of hardware and software are readily configured for operation on a local area network (LAN), or other network.

Today network management tools which perform operations in the pre-boot environment are incapable of integrating other categories or types of machines or resources into their management activity. In particular, existing network management platforms fail to address pre-boot management of mainframe-based target machines, such as virtual machines instantiated and managed under the VM™ (Virtual Machine) family of operating environments provided by IBM Corp., and others It may be desirable to provide methods and systems capable of integrating mainframe-based virtual machines and other resources into a pre-boot execution environment managed by network management tools.

DESCRIPTION OF THE DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Embodiments of the present teachings relate to systems and methods for the management of mainframe resources in a pre-boot environment. More particularly, embodiments relate to platforms and techniques for equipping a mainframe installation with a set of resources to permit mainframe-based virtual machines to communicate with a network management platform having pre-boot control functions. In embodiments, the network management platform can be or include a PXE-based or PXE-compatible network management platform. In embodiments, the set of mainframe-based virtual machines can comprise a set of virtual machines generated and managed on a time-slice or other time-managed basis, such as, for example, machines instantiated under the VM™ family of operating systems, such as the Z/VM™ operating system or platform, or other platforms. These and other embodiments described herein provide a network administrator with an ability to integrate a set of virtual mainframe-based machines or other resources into a pre-boot execution environment, even if those resources do not include individual network adapters, basic input/output system (BIOS) code, or other target resources which the network management platform is configured to expect.

Reference will now be made in detail to exemplary embodiments of the present teachings, which are illustrated in the accompanying drawings. Where possible the same reference numbers will be used throughout the drawings to refer to the same or like parts.

Figure 1:
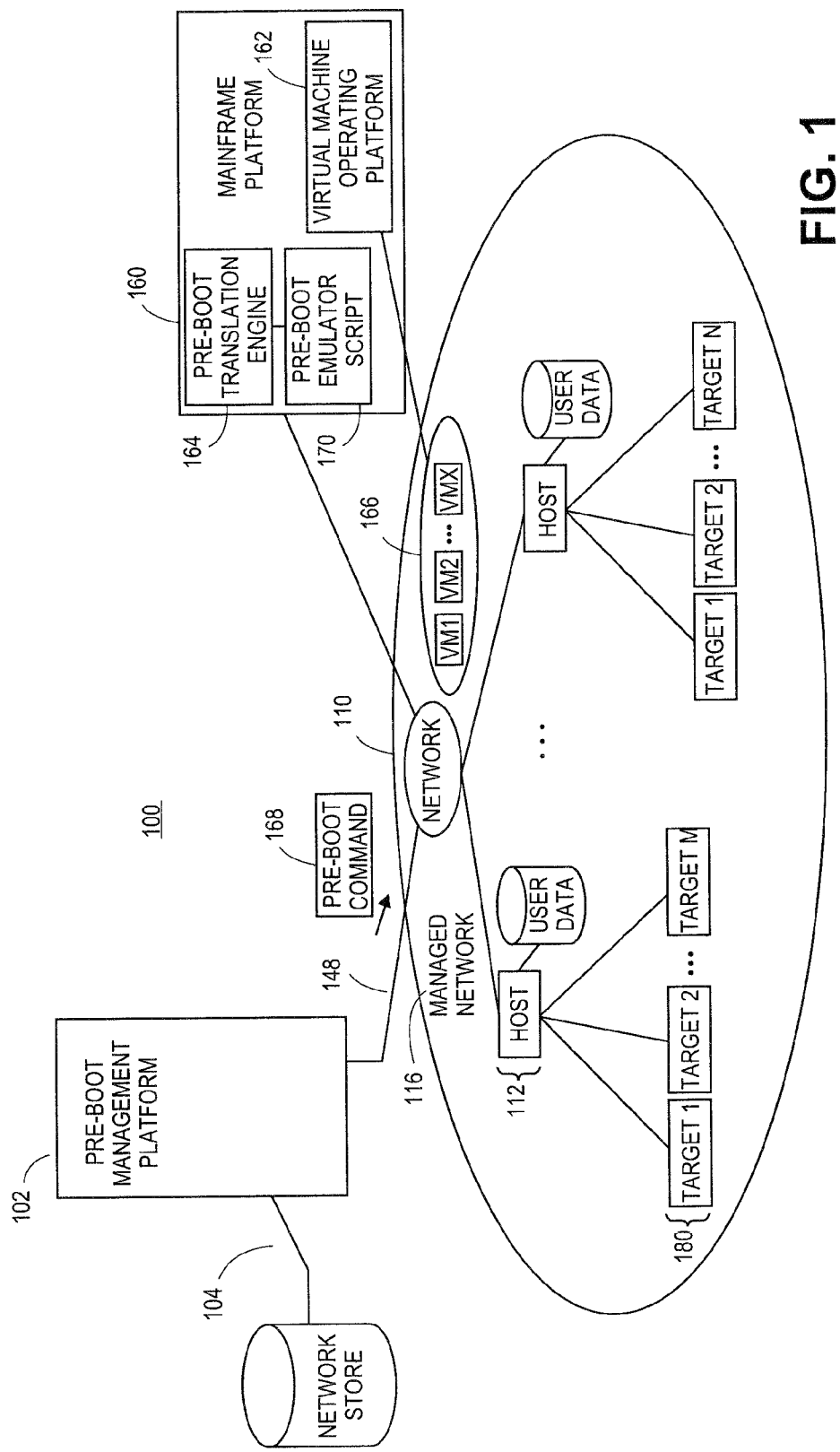
FIG. 1 illustrates an overall network in which systems and methods for the management of mainframe resources in a pre-boot environment can be practiced, according to various embodiments of the present teachings.

FIG. 1 illustrates an overall system 100 in which systems and methods for management of mainframe resources in a pre-boot environment can be implemented, according to various embodiments of the present teachings. In embodiments as shown, network management platform 102 can communicate with managed network 116 via a secure channel 148. Secure channel 148 can for instance be or include the secure channel and related resources described in co-pending U.S. application Ser. No. 12/130,424, filed May 30, 2008, entitled "Systems and Methods for Remote Management of Networked Systems Using Secure Modular Platform," which published as U.S. Patent Application Publication No. 2009/0300180, assigned or under obligation of assignment to the same entity as this application, and which application is incorporated by reference herein. Secure channel 148 can be or include, for example, a secure socket layer (SSL) connection, a channel established using a public/private key infrastructure, and/or other connections, channels, or protocols. In embodiments, channels or connections other than a secure channel 148 can be used, such as an unencrypted or otherwise non-secure channel. Managed network 116 can include, as shown, a set of hosts 112, a set of targets 180, and/or other machines, devices, clients, and/or other hardware, software, storage or other resources.

While secure channel 148 is illustratively shown as one channel to managed network 116 or devices therein, it will be understood that in embodiments, secure channel 148 can comprise multiple channels or connections. In embodiments, secure channel 148 can be replaced by a non-secure channel or connection. In general, network management platform 102 can communicate with the managed network 116 and its constituent machines and resources, which can for instance comprise personal computers, servers, network-enable devices, virtual machines, and/or other devices, and manage the security of those machines under the supervision of network management platform 102.

The network management platform 102 can host a set of engines, logic, and/or other resources to interrogate managed network 116 and manage the servers, hosts, clients, targets, services, and/or other resources of managed network 116. Network management platform 102 can communicate with associated network store 104 to store network-related management data. In embodiments, managed network 116 can comprise a set of hardware-implemented machines including, as illustrated, a set of hosts 112, set of targets 180, data stores, and/or other hardware resources. In embodiments, managed network 116 can likewise include an installed or instantiated set of virtual machines 166, in addition to hardware-implemented machines.

In embodiments as shown, set of virtual machines 166 can comprise a set of virtual machines instantiated under the guidance of a virtual machine operating platform 162, such as a hypervisor or virtualized operating system or platform. In embodiments, virtual machine operating platform 162 can be hosted in and/or run by a mainframe platform 160. In embodiments, mainframe platform 160 can comprise a processor, memory, storage, and/or other resources installed on a comparatively large scale, such as the System z10™ or other mainframe platforms available from IBM Corp. or other vendors.

In embodiments, virtual machine operating platform 162 can operate to build, configure, and instantiate the set of virtual machines 166 from the resources of mainframe platform 160. In embodiments, the set of virtual machines 166 can be virtualized from the hardware resources of mainframe platform 160. According to various embodiments, resources of mainframe platform 160 used to support set of virtual machines 166 can be allocated to partitions on a one-to-one mapping with the underlying physical hardware, without sharing resources among partitions. According to embodiments, those hardware resources can be managed by software, firmware, and/or other logic such as virtual machine operating platform 162. In embodiments, the underlying hardware resources can be shared between partitions, if desired.

According to embodiments, resources of mainframe platform 160 can be managed by virtual machine operating platform 162 and/or other software or logical layers, combined into shared resource pools, and allocated to users of the set of virtual machines 166 as logical resources, separating the presentation of the resources from the supporting physical hardware. According to various embodiments, virtual machine operating platform 162 can include software and logic components including a hypervisor, or a set of software or logic that virtualizes the underlying hardware environment of mainframe platform 160. In embodiments, virtual machine operating platform 162 can comprise a virtual machine-only operating system, supporting an operating environment on each virtual machine in set of virtual machines 166. According to embodiments, the virtual machine or other guest systems in set of virtual machines 166 can access, instantiate, and operate with or on virtual components including processors, memory, storage, I/O devices, network connections, and/or other hardware, software, data, and/or other resources. According to embodiments, operating systems and associated applications can execute in the set of virtual machines 166 as if the virtual machine or other guest system was executing on underlying physical hardware or other resources. In embodiments, different virtual machines in set of virtual machines 166 can host or execute the same or different operating systems and/or software applications.

In embodiments, set of virtual machines 166 can be generated from the processor, memory, and/or other resources of mainframe platform 160 based on a time-shared or time-sliced basis, so that users of individual virtual machines populating the set of virtual machines 166 can access or receive all or some portion of the resources of mainframe platform 160 every predetermined time period, such as a 1 millisecond interval, a 500 millisecond interval, or other greater or lesser, regular or irregular interval.

In embodiments, a pre-boot management platform 102 that acts to register, monitor, and track the constituent machines and services in managed network 116 during a pre-boot phase of operations of those machines. In embodiments, pre-boot management platform 102 can be or include a PXE-based engine, or a PXE-compatible or functionally similar application, logic, or other resources that communicate with the complete complement of both hardware-implemented and virtual machines installed in managed network 116. In embodiments, hardware-implemented machines such as, for example, set of hosts 112, set of targets 180, and/or other hardware-implemented resources such as other services, clients, databases, or other devices can communicate with pre-boot management platform 102 during a start-up, pre-boot, or other initiation phase of operation. In embodiments, as noted pre-boot management platform 102 can receive an indication of the initial connection or power-on of a hardware-implemented machine to managed network 116. In embodiments, the powered-on hardware-implemented or virtual machine can inquire from pre-boot management platform for rules or instructions regarding what the machine is initially required to perform, such as generate a display a menu of valid profiles to install, boot a specific installation profile, boot an installation from local storage, or other processing.

In embodiments, pre-boot management platform 102 can communicate with detected hardware devices to issue a set of pre-boot commands 168 to that device or devices. Set of pre-boot commands 168 can include commands and/or other data to control the operation of the subject device prior to loading an operating system or other software. Set of pre-boot commands 168 can include commands and/or other data to, for example, configure network connections, services, and/or software of the subject machine or device, authenticate or validate the use or operation of the subject machine or device, or perform other operations. According to embodiments, pre-boot management platform 102 can cause the subject machine or device to boot into an installed or native operating system of the device, once pre-boot operations are completed.

In embodiments, managed network 116 can likewise manage set of virtual machines 166 during pre-boot operations, despite the absence of hardware MAC addresses or other hardware-based identifiers for those virtual assets. According to embodiments, pre-boot management platform 102 can interact with pre-boot translation engine 164 to communicate with mainframe platform 160 and/or virtual machine platform 162 to access, identify, and control pre-boot or pre-instantiation operations of set of virtual machines 166. In embodiments, pre-boot translation engine 164 can be hosted in mainframe platform 160, as shown. In embodiments, pre-boot translation engine 164 can be hosted in other locations or resources, including, for instance, network management platform 102. According to embodiments, pre-boot translation engine 164 can be configured in or with, or support execution of scripts via a pre-boot emulator script 170, such as a script or interpreter in a language such as ReXX™ (Restructured Extended Executor) supported by IBM Corp., or other languages or protocols.

In embodiments, pre-boot translation engine 164 can interrogate pre-boot management platform 102 to determine what actions should be taken when initiating set of virtual machines 166 and/or time slices of mainframe platform 160 used to support those virtual machines. In embodiments, pre-boot translation engine 164 can pass data including set of pre-boot commands 168 back and forth between pre-boot management platform 102 and set of virtual machines 166 via mainframe platform 160 and/or virtual machine platforms 162, for instance using hyper text transfer protocol (http), file transfer protocol (ftp), trivial file transfer protocol (tftp), or other protocols, commands, or connections. In embodiments, pre-boot management platform 102 can thereby detect, configure and manage set of virtual machines 166 to control the pre-boot operations of those resources, without a requirement for hardware identifiers and/or other hardware attributes.

Figure 2:
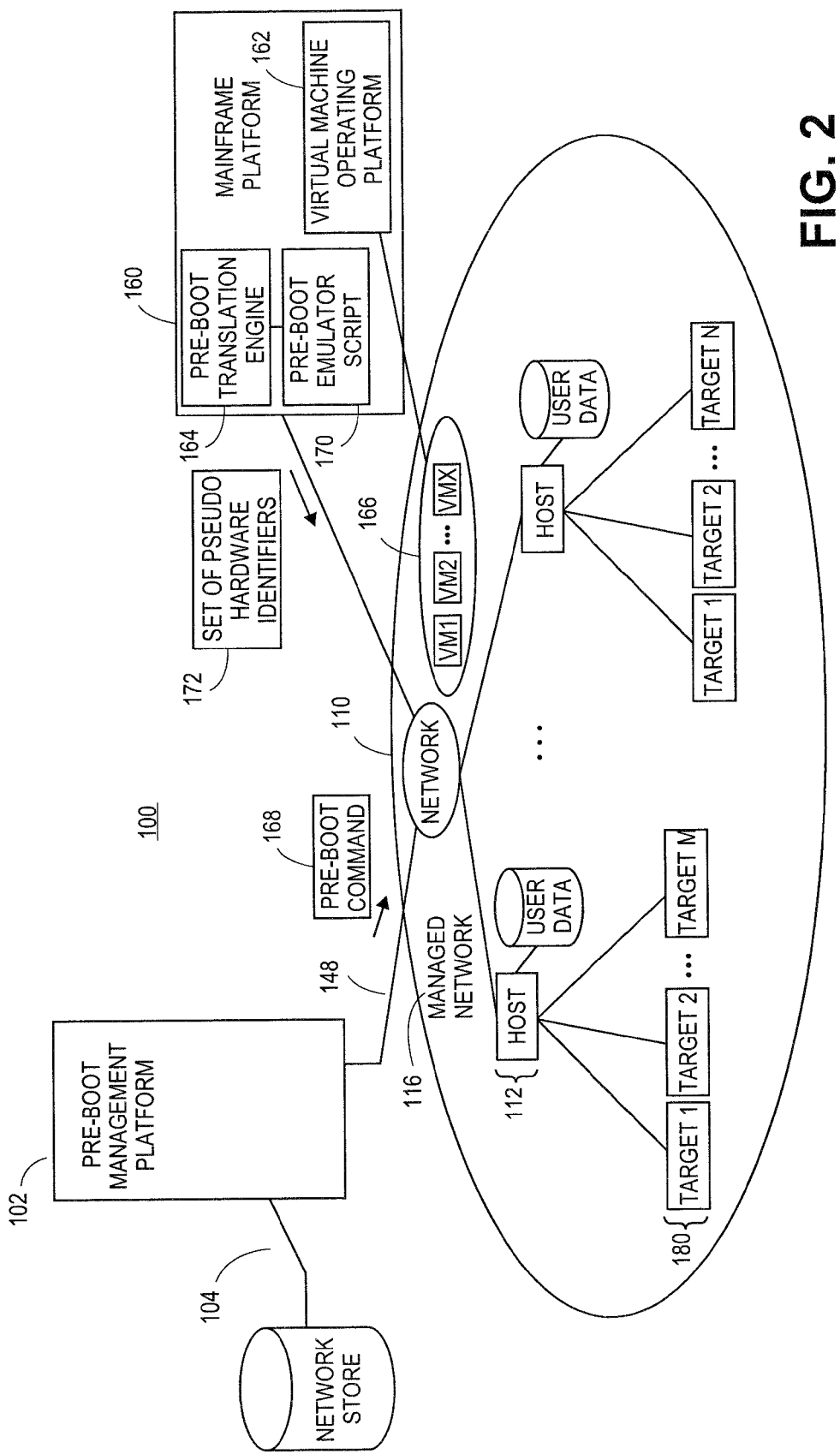
FIG. 2 illustrates an overall network in which systems and methods for the management of mainframe resources in a pre-boot environment can be practiced in various further regards, including pre-boot messaging to a mainframe-based set of virtual machines.

As, for, example more particularly shown in FIG. 2, in embodiments, pre-boot management platform 102 can interrogate set of hosts 112, set of targets 180, and/or other servers, hosts, clients, targets, and/or other machines implemented or realized as separate hardware entities in managed network 116, to initiate a pre-boot configuration and/or management process. In embodiments, the hardware hosts, targets, and/or other entities can be identified via hardware identifiers such as media access control (MAC) addresses encoded in a local area network (LAN) card, or other network device or connection. In embodiments, other identifiers such as, for example, an Internet Protocol (IP) address, virtual machine (VM) name or identifier, a z/VM™ user ID, or other identifiers can be used. In embodiments, machines discovered by way of MAC addresses and/or other identifiers can be controlled via the transmission of a set of pre-boot commands 168, such as PXE-based, PXE-compatible, or functionally similar commands or data.

According to embodiments in one regard, as also shown in FIG. 2, network management platform 102 can thereby operate to connect to a given one or more virtual machine hosted in set of virtual machines 166, to conduct pre-boot configuration and control of those entities. According to embodiments as shown, pre-boot management platform 102 can communicate with pre-boot translation engine 164 to exchange set of pre-boot commands 168 and other data, to conduct those operations. In embodiments as shown, pre-boot translation engine 164 can generate and transmit a set of pseudo-MAC addresses 172 to pre-boot management platform 102, to identify newly instantiated or installed virtual machines in set of virtual machines 166. In embodiments, pre-boot management platform 102 can receive set of pseudo-MAC addresses 172 to identify connected virtual machines, to initiate and control pre-boot operations. After the identified virtual machines have been registered via set of pseudo-MAC addresses or other temporary or virtual hardware identifiers, pre-boot management platform 102 can interrogate and configure set of virtual machines 166 in manners similar to set of hosts 112, set of targets 180, and/or other hardware-implemented machines. In embodiments, for example, pre-boot management platform 102 can configure the installation of defined applications or other software in the subject virtual machine or machines. In embodiments, network configurations can be controlled during a pre-boot, per-instantiation, or other stage of operation of set of virtual machines 166. Other network control operations on set of virtual machines 166 can be carried out.

Figure 3:
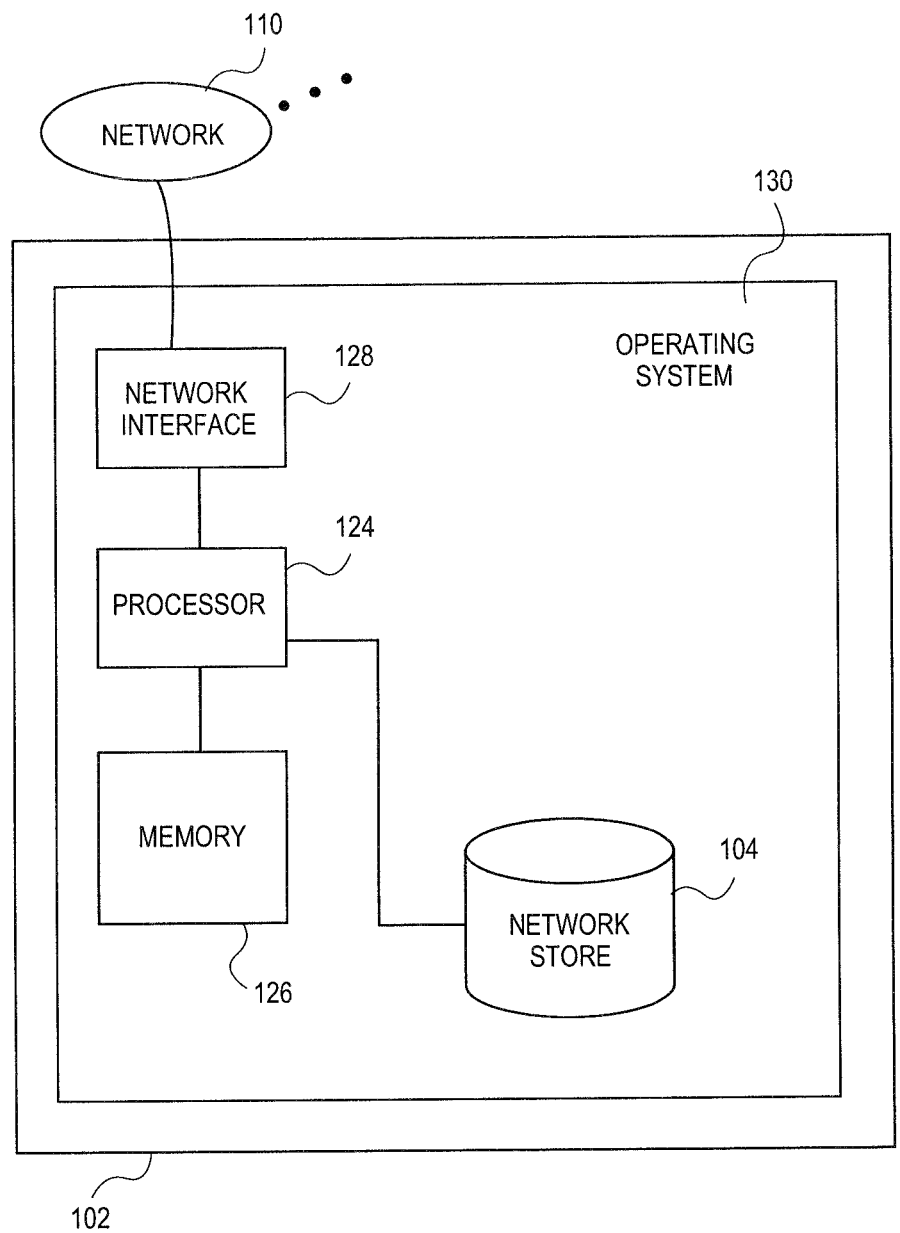
FIG. 3 depicts an illustrative hardware configuration which can support systems and methods for the management of mainframe resources in a pre-boot environment, according to various embodiments of the present teachings.

FIG. 3 illustrates an exemplary diagram of hardware and other resources that can be incorporated in a pre-boot management platform 102 configured to communicate with managed network 116 including set of virtual machines 166 and/or other resources, according to embodiments. In embodiments as shown, the pre-boot management platform 102 can comprise a processor 124 communicating with memory 126, such as electronic random access memory, operating under control of or in conjunction with operating system 130. Operating system 130 can be, for example, a distribution of the Linux™ operating system, the Unix™ operating system, or other open-source or proprietary operating system or platform. Processor 124 also communicates with a network store 104, such as a database stored on a local hard drive. Processor 124 further communicates with network interface 128, such as an Ethernet or wireless data connection, which in turn communicates with one or more networks 110, such as the Internet or other public or private networks. Processor 124 also communicates with pre-boot management platform 102 and/or other resources or logic, to execute control and perform pre-boot management processes described herein. Other configurations of the pre-boot management platform 102, associated network connections, and other hardware and software resources are possible. While FIG. 3 illustrates pre-boot management platform 102 as a standalone system comprises a combination of hardware and software, pre-boot management platform 102 can also be implemented as a software application or program capable of being executed by a conventional computer platform. Likewise, pre-boot management platform 102 can also be implemented as a software module or program module capable of being incorporated in other software applications and programs. In either case, pre-boot management platform 102 can be implemented in any type of conventional proprietary or open-source computer language.

Figure 4:
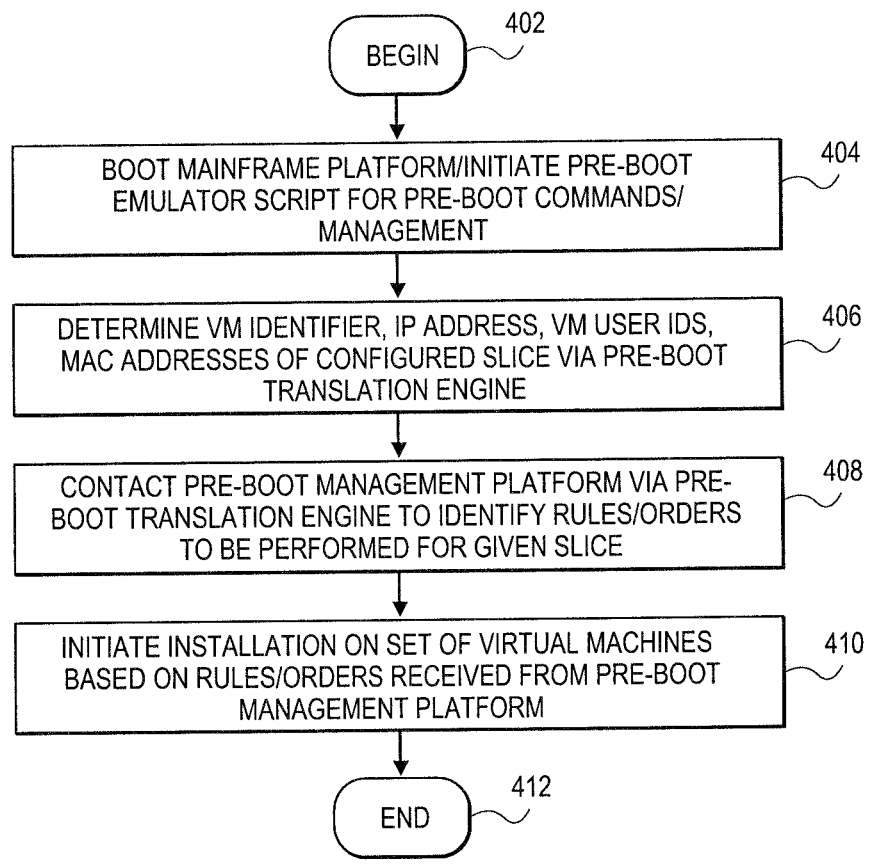
FIG. 4 illustrates a flowchart of processing of mainframe resources in a pre-boot environment, according to various embodiments of the present teachings.

FIG. 4 illustrates a flowchart of processing to perform management of mainframe resources in a pre-boot environment, according to various embodiments. In 402, processing can begin. In 404, mainframe platform 160 can be booted, and pre-boot emulator script 170 can be initiated to generate or process pre-boot commands and boot management. In 406, pre-boot translation engine 164 of mainframe platform 160 can determine a set of pseudo hardware identifiers, such as media access control (MAC) addresses encoded in a local area network (LAN) card, one or more Internet Protocol (IP) address, one or more virtual machine (VM) name or identifier, one or more z/VM™ user ID, or other identifier.

In 408, pre-boot management platform 102 can be contacted via pre-boot translation engine 164 of mainframe platform 160 to identify set of pre-boot commands 168 to be performed on the given time slice and other resources of mainframe platform 160 to instantiate set of virtual machines 166. In embodiments, set of pre-boot commands 168 can be or include, for example, a set of software configuration commands, such as commands to load, access, or instantiate applications, operating systems, and/or other software. Set of pre-boot commands 168 can be or include further commands, such as network configuration commands, security commands, and/or other commands or data. In embodiments, set of pre-boot commands 168 can be or include commands defined by, compatible with, or functionally similar to the pre-boot execution environment (PXE) standard, and/or other pre-boot or pre-execution standards or protocols.

In 410, the installation or instantiation of set of virtual machines 166 can be initiated based on the rules, commands, orders, or other instructions or data received in set of pre-boot commands 168 from pre-boot management platform 102. In 412, processing can repeat, return to a prior processing point, jump to a further processing point, or end.

The foregoing description is illustrative, and variations in configuration and implementation may occur to persons skilled in the art. For example, while embodiments have been described in which hardware-implemented machines are identified via a MAC address on a LAN card and set of virtual machines 166 are identified via a pseudo or temporary version of the same address, in embodiments, other types of address or identifiers for both hardware and virtual machines can be used. For further example, while embodiments have been described in which managed network 116 incorporates one set of virtual machines 116 which are instantiated via one mainframe platform 160, in embodiments, managed network 116 can incorporate more than one set of virtual machines. In embodiments, one mainframe platform can instantiate and manage more than one set of virtual machines. In embodiments, multiple mainframe computers or platforms can each instantiate and manage separate sets of virtual machines. Other resources described as singular or integrated can in embodiments be plural or distributed, and resources described as multiple or distributed can in embodiments be combined. The scope of the present teachings is accordingly intended to be limited only by the following claims.

What is claimed is:

1. A method comprising:
receiving, by a processing device executing a pre-boot management engine via a network from a remote physical machine, a set of pseudo hardware-based identifiers comprising a set of pseudo media access control (MAC) addresses and representing a set of virtual machines hosted by the remote physical machine and managed on a time-sliced basis, wherein resources of the remote physical machine are available to each virtual machine in the set of virtual machines at a regular interval, and wherein the remote physical machine is without pre-boot management logic;
generating, by the processing device executing the pre-boot management engine, a set of pre-boot commands in view of the set of pseudo hardware-based identifiers, the pre-boot commands to control operation of the set of virtual machines prior to loading an operating system on the set of virtual machines; and
transmitting the set of pre-boot commands, via the network, to the remote physical machine hosting the set of virtual machines for execution by the set of virtual machines.

2. The method of claim 1, wherein the pre-boot management engine comprises a pre-boot management engine functionally compatible with a pre-boot execution environment (PXE) engine.

3. The method of claim 1, wherein the set of pseudo hardware-based identifiers comprises at least one of a set of Internet Protocol (IP) addresses, a set of virtual machine (VM) identifiers, or a virtual machine (VM) user ID.

4. The method of claim 1, wherein the set of virtual machines comprises a set of virtual machines hosted via a mainframe platform.

5. The method of claim 1, wherein the network comprises at least the set of virtual machines and a set of hardware-implemented machines.

6. The method of claim 1, wherein the set of pre-boot commands comprises at least one of a set of software configuration commands, a set of network configuration commands, or a set of security commands.

7. The method of claim 1, further comprising initiating operation of the set of virtual machines via a native operating system of the set of virtual machines after completion of the set of pre-boot commands.

8. A system comprising:
a memory to store instructions for a pre-boot management engine;
an interface to a managed network that comprises a remote physical machine that is without pre-boot management logic, wherein the pre-boot management engine communicates with the managed network via the interface; and
a processor, operably connected to the memory, to execute the instructions for the pre-boot management engine, to:
establish a connection to the managed network via the interface,
receive, from the remote physical machine, a set of pseudo hardware-based identifiers comprising a set of pseudo media access control (MAC) addresses and representing a set of virtual machines hosted by the remote physical machine and managed on a time-sliced basis, where resources of the remote physical machine are available to each virtual machine in the set of virtual machines at a regular interval,
generate a set of pre-boot commands in view of the set of pseudo hardware-based identifiers, the pre-boot commands to control operation of the set of virtual machines prior to loading an operating system on the set of virtual machines, and
transmit the set of pre-boot commands, via the managed network, to the remote physical machine hosting the set of virtual machines for execution by the set of virtual machines.

9. The system of claim 8, wherein the pre-boot management engine comprises a pre-boot management engine functionally compatible with a pre-boot execution environment (PXE) engine.

10. The system of claim 8, wherein the set of pseudo hardware-based identifiers comprises at least one of a set of Internet Protocol (IP) addresses, a set of virtual machine (VM) identifiers, or a virtual machine (VM) user ID.

11. The system of claim 8, wherein the set of virtual machines comprises a set of virtual machines hosted via a mainframe platform.

12. The system of claim 8, wherein the managed network comprises at least the set of virtual machines and a set of hardware-implemented machines.

13. The system of claim 8, wherein the set of pre-boot commands comprises at least one of a set of software configuration commands, a set of network configuration commands, or a set of security commands.

14. The system of claim 8, wherein the pre-boot management engine is further to initiate operation of the set of virtual machines via a native operating system of the set of virtual machines after completion of the set of pre-boot commands.

15. A system comprising:
a pre-boot management platform, communicatively connected to a remote physical machine hosting a set of virtual machines, the pre-boot management platform comprising a processing device, the processing device to:
provide a connection between a pre-boot management engine and the remote physical machine that is configured without pre-boot management logic;
receive, by the pre-boot management engine from the remote physical machine, a set of pseudo hardware-based identifiers comprising a set of pseudo media access control (MAC) addresses and representing the set of virtual machines hosted by the remote physical machine and managed on a time-sliced basis, where resources of the remote physical machine are available to each virtual machine in the set of virtual machines at a regular interval;

generate a set of pre-boot commands in view of the set of pseudo hardware-based identifiers, the pre-boot commands to control operation of the set of virtual machines prior to loading an operating system on the set of virtual machines; and transmit the set of pre-boot commands, via a managed network, to the remote physical machine hosting the set of virtual machines for execution by the set of virtual machines.

16. The system of claim 15, wherein the remote physical machine is configured without pre-boot management logic, and wherein the pre-boot management engine comprises a pre-boot management engine functionally compatible with a pre-boot execution environment (PXE) engine.

17. The system of claim 15, wherein the set of pseudo hardware-based identifiers comprises at least one of a set of Internet Protocol (IP) addresses, a set of virtual machine (VM) identifiers, or a virtual machine (VM) user ID.

18. The system of claim 15, wherein the set of virtual machines comprises a set of virtual machines hosted via a mainframe platform.

19. The system of claim 15, wherein the managed network further comprises a set of hardware-implemented machines.

20. The system of claim 15, wherein the set of pre-boot commands comprises at least one of a set of software configuration commands, a set of network configuration commands, or a set of security commands.

* * * * *